(12) United States Patent
Kiblawi

(10) Patent No.: US 7,465,314 B2
(45) Date of Patent: Dec. 16, 2008

(54) DESICCANT CARTRIDGE

(75) Inventor: Daniel F. Kiblawi, Farmington Hills, MI (US)

(73) Assignee: Hutchinson FTS, Inc., Troy, MI (US)

( * ) Notice: Subject to any disclaimer, the term of this patent is extended or adjusted under 35 U.S.C. 154(b) by 219 days.

(21) Appl. No.: 11/330,890

(22) Filed: Jan. 12, 2006

(65) Prior Publication Data

US 2007/0157658 A1  Jul. 12, 2007

(51) Int. Cl.
F25B 43/02  (2006.01)

(52) U.S. Cl. .................. 62/474; 62/509; 220/306; 210/266

(58) Field of Classification Search ............ 62/474, 62/509, 473, 475, 476; 210/266, 282, DIG. 6, 210/DIG. 7; 95/117, 118, 120; 96/108, 142, 96/147, 152; 220/306, 307, 352, 356
See application file for complete search history.

(56) References Cited

U.S. PATENT DOCUMENTS

| | | | |
|---|---|---|---|
| 3,047,993 A * | 8/1962 | Robbins | 96/134 |
| 3,127,257 A * | 3/1964 | Superlock | 96/139 |
| 3,879,292 A * | 4/1975 | McClive | 210/282 |
| 5,522,204 A | 6/1996 | Wood | |
| 5,529,203 A * | 6/1996 | Flaugher | 220/787 |
| 5,540,348 A * | 7/1996 | Wood | 220/506 |
| 5,569,316 A | 10/1996 | Flaugher et al. | |
| 5,580,451 A | 12/1996 | Tack | |
| 5,685,087 A | 11/1997 | Flaugher et al. | |
| 5,716,432 A * | 2/1998 | Perrine | 96/135 |
| 5,718,743 A * | 2/1998 | Donnelly et al. | 96/135 |
| 5,911,879 A * | 6/1999 | Eybergen | 210/282 |
| 6,309,450 B1 | 10/2001 | Millen et al. | |
| 6,389,843 B2 * | 5/2002 | McAllister et al. | 62/509 |
| 6,623,549 B1 * | 9/2003 | Evans et al. | 96/117.5 |
| 7,314,508 B2 * | 1/2008 | Evans | 96/135 |

* cited by examiner

Primary Examiner—Mohammad M Ali
(74) Attorney, Agent, or Firm—VanOphem & Van Ophem, P.C.

(57) ABSTRACT

A desiccant cartridge for use with a receiver/dryer of an automobile air-conditioning system. The desiccant cartridge contains a cup member and a cap member. The cap member includes a plurality of fingers located about a periphery thereof. The plurality of fingers engage the cup member to secure the cap member to the cup member. The plurality of fingers operate to facilitate insertion of the cap member into the cup member using a one-way lock-type arrangement. Accordingly, pushing the cap member downward into the open end of the cup member causes each of the plurality of fingers to deflect upward and slide along an interior surface free of protrusions of the cup member. Upward movement of the cap is limited by the plurality of fingers engaging the interior surface of the sidewall, which hold the cap member in place. Accordingly, the cap member can be inserted into and locks in the cup member at any position.

16 Claims, 3 Drawing Sheets

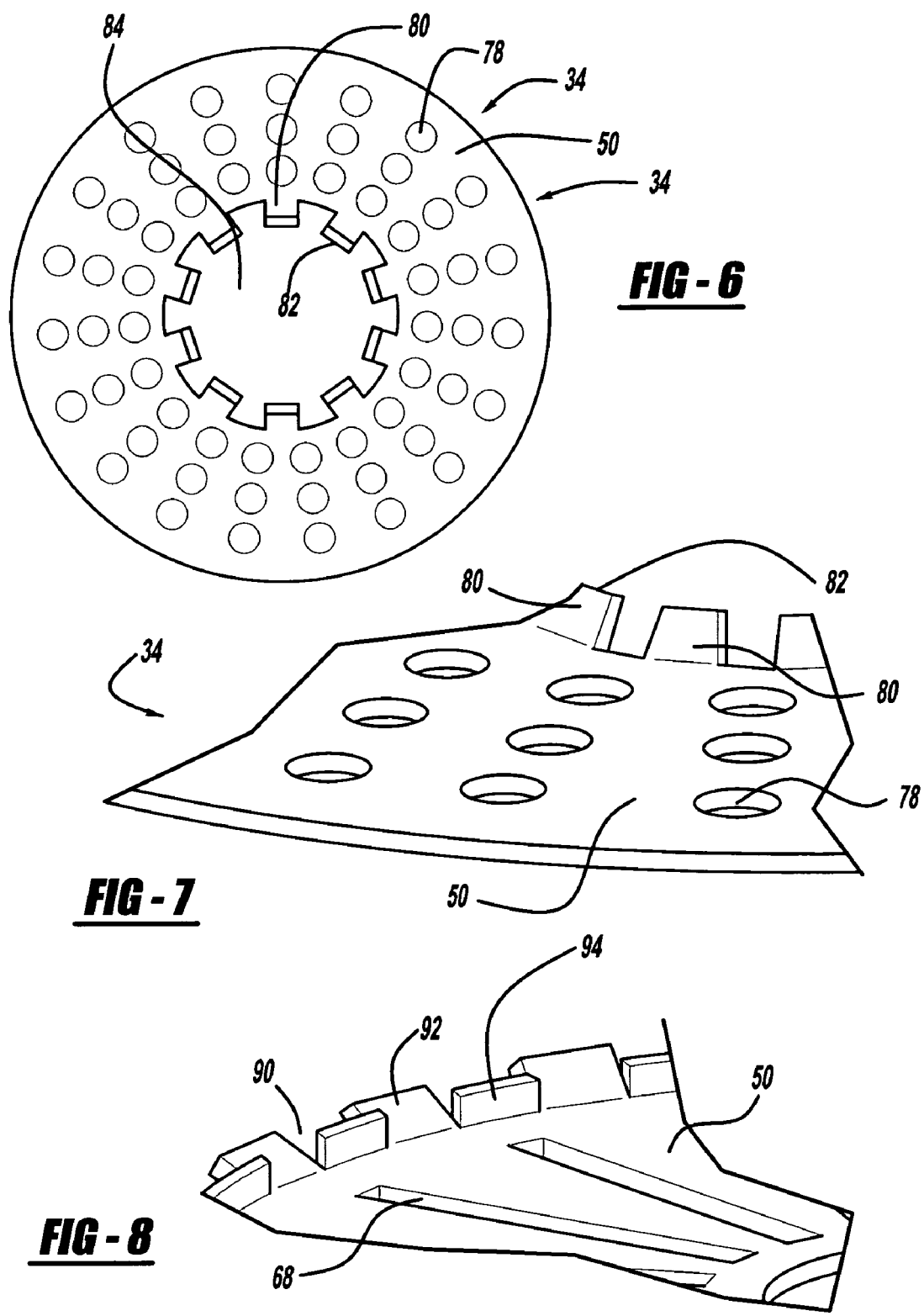

DESICCANT CARTRIDGE

CROSS-REFERENCE TO RELATED APPLICATIONS

Not Applicable.

FEDERALLY SPONSORED RESEARCH OR DEVELOPMENT

Not Applicable

BACKGROUND OF THE INVENTION

1. Field of the Invention

The present invention relates generally to a desiccant cartridge for an accumulator dehydrator or receiver/dryer for use with an automotive air-conditioning system. More specifically, the invention relates to a desiccant cartridge retention system used with an accumulator dehydrator or receiver dryer.

2. Description of Related Art

Automotive air-conditioning systems commonly use desiccants for dehydrating air and refrigerants. In an automotive air-conditioning system, a receiver/dryer device positioned between the condenser and the thermal expansion valve operates to remove moisture or contaminants from the refrigerant. In operation, the refrigerant flows through the receiver/dryer and correspondingly through the desiccant contained therein whereby the desiccant performs its intended function of removing moisture from the refrigerant. During manufacture of the receiver/dryer, the desiccant is placed and secured within the interior of the receiver/dryer.

Different methods and apparatuses for securing the desiccant within the receiver/dryer are known. Where particulate desiccants are commonly used, the desiccant is held within the receiver/dryer in a manner that allows the refrigerant to pass through the desiccant to remove moisture from the refrigerant while preventing the desiccant from escaping and contaminating the air-conditioning system. One prior art method of containing the desiccant is by placing the desiccant in a permeable bag; i.e., one that enables the refrigerant to pass through while adequately containing or capturing the desiccant. This permeable bag containing the desiccant is placed within the receiver/dryer.

One example of such a system is illustrated in U.S. Pat. No. 6,309,450 to Millen et al. Millen et al. teaches a pair of fabric adsorbent units, filled with a suitable adsorbent. The fabric adsorbent units are placed within the housing of a receiver/dryer. The adsorbent units are driven against an inner wall of the housing of the receiver/dryer when sandwiched between a movable grid and an enlarged frustroconical portion of a tubular member extending longitudinally along the center axis of the housing. During assembly, the movable grid slides over the tubular member. A plurality of downwardly extending serrations on the tubular member and a plurality of complementary upwardly extending serrations on the movable grid cooperate to form a one-way ratchet type lock that secures the moveable grid to the tubular member. Accordingly, compressing the adsorbent units between the movable grid and the frustroconical portion of the tubular member, forces them outwardly against the inner sidewalls of the housing to form a seal whereby the refrigerant passes through the adsorbent units.

Using a desiccant bag has several drawbacks. One such drawback is that the form and shape of the desiccant bag does not always conform to the canister. The desiccant should extend across the entire cross-section of the refrigerant path to prevent refrigerant bypass of the desiccant. In addition, a problem may arise with adequately sealing the permeable bag to prevent loss of the desiccant and possible contamination of the system.

Another method of containing a desiccant is to place a desiccant in a cartridge or container. Subsequently the desiccant container is placed within the receiver/dryer or accumulator during manufacture of the receiver/dryer. For example U.S. Pat. No. 5,580,451 (Tack); U.S. Pat. No. 5,522,204 (Wood); U.S. Pat. No. 5,569,316 (Flaugher et al.); and U.S. Pat. No. 5,685,087 (Flaugher et al.) illustrate the use of a container assembly uniformly filled with a suitable desiccant. The desiccant container typically fits tightly within the housing of the receiver/dryer to prevent air or refrigerant from bypassing the desiccant container and ensure flow of the refrigerant over the desiccant.

As illustrated in U.S. Pat. No. 5,580,451 to Tack, the desiccant is placed within a cup assembly including a cup having an open upper end, a closed lower end, and a centrally located tubular portion. After a suitable amount of desiccant is placed within the cup, a cap is placed in the open upper end to retain the desiccant within the cup. Both the cap and the closed lower end include a number of apertures to permit the refrigerant to enter and flow through the cup assembly. A plurality of axially spaced nibs located on the inner wall of the cup operate to secure the cap within the cup. The nibs form a number of discrete detents between adjacent nibs. Accordingly, the cap locks only at discrete positions.

Typically, the amount of desiccant contained in the cup or container is based on weight such that the amount of desiccant deposited in a cup or cartridge varies because of variation in desiccant density. Further, it is desirable to compact the desiccant to reduce the amount of movement between the individual desiccant particles. Reducing movement or agitation of the particles correspondingly reduces desiccant abrasion and breakdown of the desiccant into smaller particles that may leak into the system. Accordingly, since the cap will only lock at discrete positions, there is the possibility that the desiccant will not be adequately secured within the cup assembly or that too much pressure is placed on the cap and correspondingly the desiccant to urge the cap downward to the next or lower discrete locking point.

From the above, it can be appreciated that receiver/dryer assemblies using desiccant containers of various types are not fully optimized with regard to securing the desiccant within a desiccant container. Therefore, what is needed is a desiccant container having a cap that is simple to assemble, reduces material and manufacturing costs and readily adapts to the level of desiccant in the container while securely retaining the desiccant within the container.

SUMMARY OF THE INVENTION

According to the preferred embodiment of the present invention, there is provided an automotive-type air-conditioning receiver/dryer utilizing a unique desiccant cartridge. The desiccant cartridge includes a cup member having an open end, a base forming a closed end and an outer wall portion having an inner surface and an outer surface. The cup member further includes a tubular portion extending upward from the base. The tubular portion defining a passageway through the interior of the cup member and forming an inner wall defining an inner boundary of an annular shaped chamber located within the cup member between the outer wall and tubular portion. The annular shaped chamber is filled with a desiccant. A cap having a plurality of fingers located on a periphery thereof is received in the open end of the cup member so that the fingers engage the cup member to secure the cap in place on the cup member.

In operation, the cap is pressed downward into the cup member until it contacts the desiccant and a sufficient force is applied to properly compact the desiccant. Since the fingers of the cap engage the cup member, they prevent upward movement of the cap. The cap operates in a simple push-type one-way lock mechanism that restricts relative movement of the desiccant within the annular chamber of the cup member regardless of the fill level of the desiccant.

In addition, both the cap and the base of the cup member have a plurality of apertures that enable flow of the refrigerant through the cup member and correspondingly the desiccant contained therein. The size, shape and number of the apertures may vary depending upon the particular desiccant used.

Accordingly, it is an object of the present invention to provide a desiccant cartridge that is readily adaptable to variations in the fill level of the desiccant.

It is yet another object of the invention to provide a desiccant cartridge that will be easily assembled while providing a secure means for holding the desiccant within the desiccant cartridge.

It is still a further object of the invention to provide a desiccant cartridge configured for use with a receiver/dryer assembly used in an automobile air-conditioning system.

It is still a further object of the invention to provide a desiccant cartridge configured for use with an accumulator dehydrator assembly used in an automobile air-conditioning system.

These object and other features, aspects and advantages of this invention will be more apparent after a reading of the following detailed description, appended claims and accompanying drawings.

BRIEF DESCRIPTION OF THE DRAWINGS

FIG. 5 is a top view of an alternative embodiment of a cap of the desiccant cartridge illustrated in FIG. 1;

FIG. 6 is an additional embodiment of a cap of the desiccant cartridge illustrated in FIG. 1;

FIG. 7 is a partial perspective view of the cap illustrated in FIG. 6; and

FIG. 8 is a partial perspective view of a further alternative embodiment of a cap of the desiccant cartridge illustrated in FIG.1.

DETAILED DESCRIPTION OF THE PREFERRED EMBODIMENTS

Figure 1:
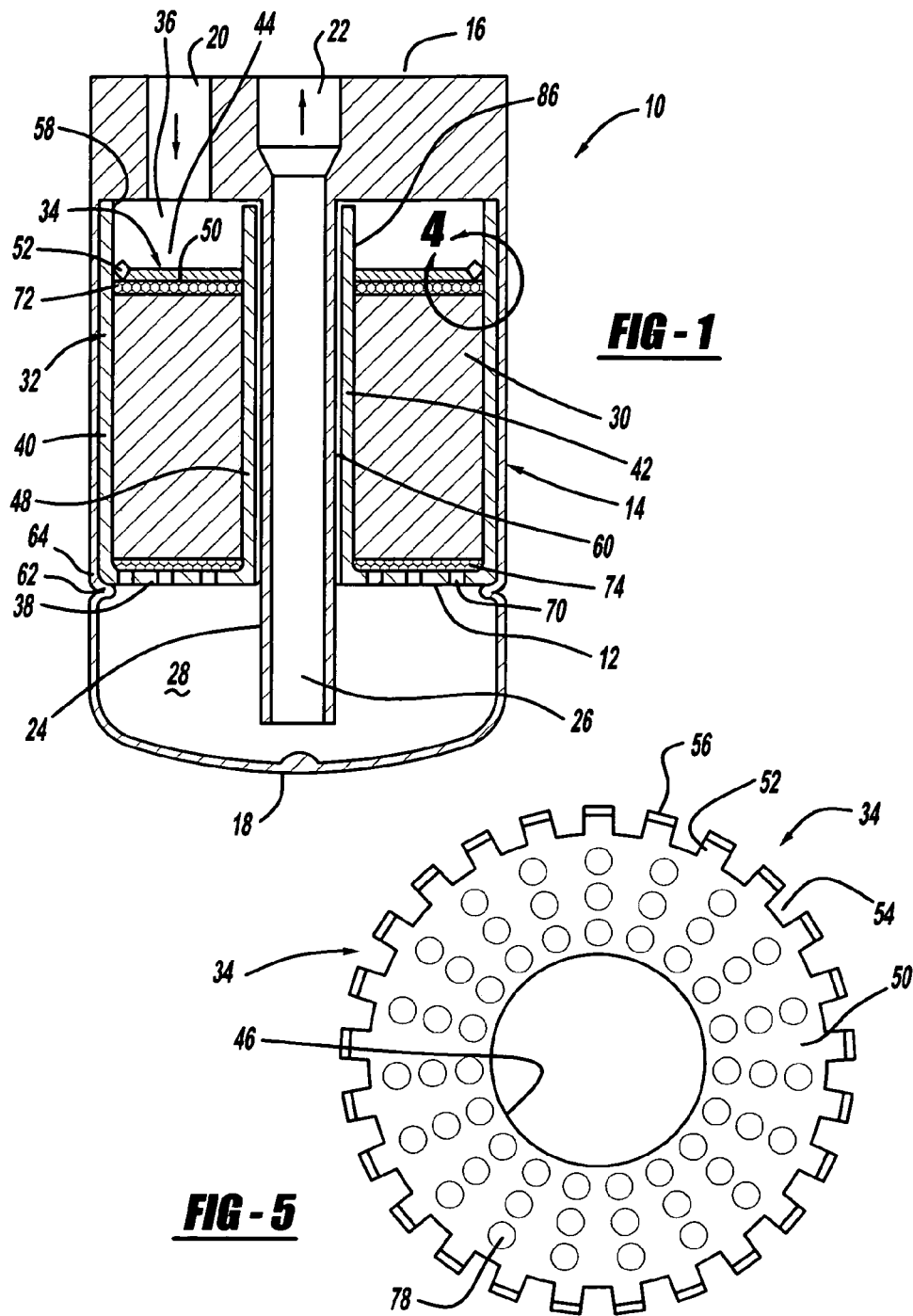
FIG. 1 is a longitudinal cross-sectional view of a receiver/dryer assembly utilizing a desiccant cartridge according to a preferred embodiment of the present invention.

Referring now in detail to the figures, FIG. 1 illustrates a receiver/dryer assembly, seen generally at 10, of a type suitable for use in an automobile air-conditioning system. The receiver/dryer assembly 10 utilizes a desiccant cartridge 12 in accordance with the present invention. The receiver/dryer assembly 10 is typically positioned between a condenser and a thermal expansion valve of an air-conditioning system and operates to remove moisture entrained in the refrigerant whereby the refrigerant delivered to the expansion valve is in a liquid phase, free of moisture.

As illustrated in FIG. 1 the desiccant cartridge 12 is located in a tank or canister 14 of the receiver/dryer assembly 10. As set forth in detail herein, the desiccant cartridge 12 is assembled and placed within the canister 14 before the canister 14 is welded shut, typically thorough a spin welding process. The canister 14 is preferably formed from an aluminum alloy that is sufficiently strong yet formable. Other suitable materials including plastic or steel may also be used. The canister 14 is preferably drawn or impacted to initially have an integral closed upper end 16 and an oppositely disposed temporarily open end that remains open during manufacture of the receiver/dryer assembly 10. Subsequently, a spin welding process closes the open end of the canister 14, after installation of the desiccant cartridge 12, to form an integral lower end 18.

The upper end 16 of the canister 14 includes an inlet port 20 and an outlet port 22 extending downward into the interior of the canister 14. As shown in FIG. 1 the outlet port 22 is centrally located in the upper end 16 of the canister 14. The inlet port 20 is fluidly connected to a condenser unit (not shown) of the air-conditioning system. As indicated by the arrows, the refrigerant enters the receiver/dryer assembly 10 through the inlet port 20 and exits through the outlet port 22 which is fluidly connected to the thermal expansion valve (not shown) of the air-conditioning system. An exit tube 24 extends downward into the canister 14 from the upper end 16 of the canister 14. The exit tube 24 fluidly communicates with the outlet port 22 and forms a return passage 26 for the refrigerant.

As illustrated in FIGS. 1-4, the desiccant cartridge 12 holds a desiccant 30, typically particles or beads of a substance such as calcium oxide or silica gel that have a high affinity for water. The desiccant cartridge 12 includes a cup member 32 having a generally cylindrical cross-section and a generally circular cap 34. The cup member 32 is typically a one-piece member having an open upper end 36, a closed lower end 38, a generally cylindrical outer sidewall 40 and a centrally located tubular portion 42 forming an inner sidewall 48 that cooperates with the outer sidewall 40 to define an annular chamber 44 that receives the desiccant 30.

The cap 34 includes a central aperture 46 sized to fit over the tubular portion 42 of the cup member 32. As illustrated, the cap 34 slides over the tubular portion 42 of the cup member 32 and into the open upper end 36 of the cup member 32. As set forth above, the cap 34 is placed in the open upper end 36 and closes or seals the annular chamber 44 after the desiccant 30 is placed within the annular chamber 44 of the cup member 32.

The cap 34 includes a flat or planar body 50 having upper 50a and lower 50b surfaces. A plurality of individual fingers 52 are located on the periphery or outer circumferential edge of the cap 34. Recesses 54 separate the individual fingers 52 from one another. In accordance with the invention, the fingers 52 are each inclined at an angle β(see FIG. 4) from the planar body 50 of the cap 34. The angle a may vary within reasonable limits, but is preferably within a range from 20° to 60°. The outer free ends of each of the fingers 52 are preferably provided with relatively sharp edges or corners 56 enabling the fingers 52 to bite into the interior surface 58 of the outer sidewall 40 of the cup member 32 and thus secure the cap 34 within the cup member 32.

Figure 2:
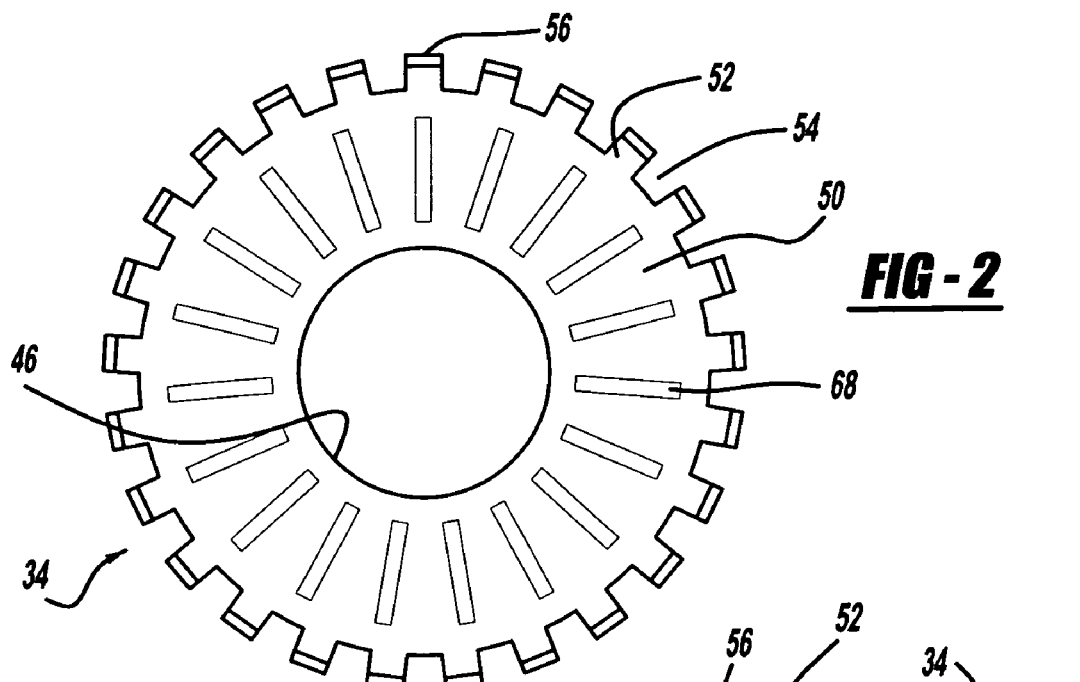
FIG. 2 is a top view of a cap of the desiccant cartridge illustrated in FIG. 1.
Figure 3:
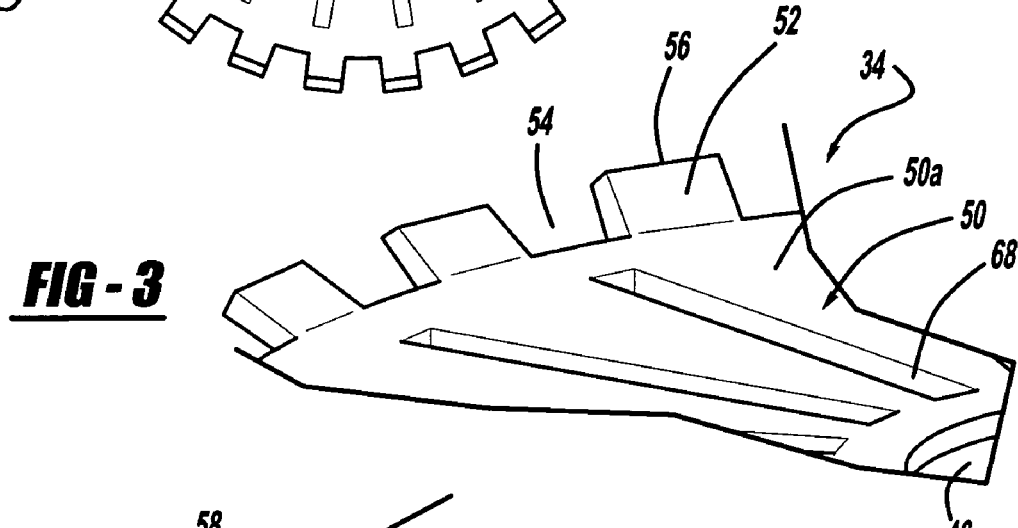
FIG. 3 is a partial perspective view of the cap illustrated in FIG. 2.
Figure 4:
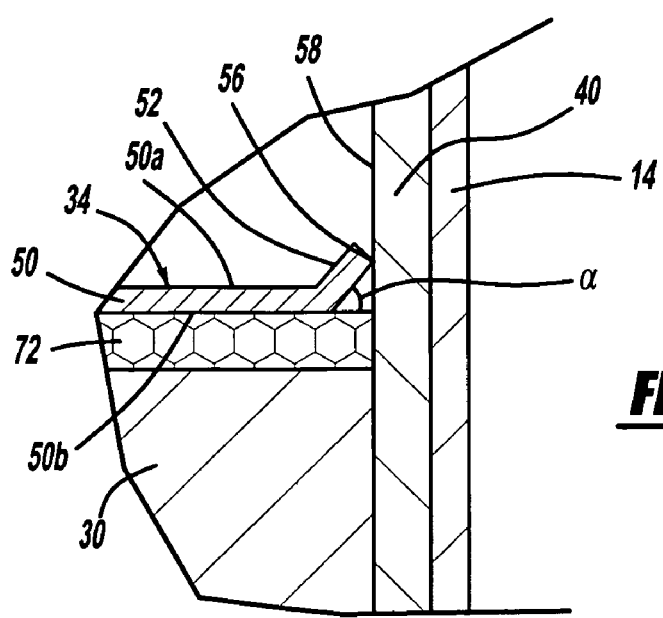
FIG. 4 is an enlarged view of the desiccant cartridge shown in circle 4 of FIG. 1.

The cap 34 and the closed lower end 38 of the cup member 32 both have a number of apertures located therein. As illustrated in FIG. 2, the apertures are shown as radial slots 68 extending outward from the central apperature 46 of the cap 34. The radial slots 68 enable refrigerant entering through the inlet port 20 of the canister 14 to flow through the desiccant cartridge 12 whereby the desiccant 30 effectively absorbs any moisture entrained within the refrigerant. The refrigerant then flows out through apertures located in the closed lower end 38 of the desiccant cartridge 12 into the lower chamber 28 located in the intergral lower end 18 of the canister 14.

As illustrated in FIG. 1, the desiccant cartridge 12 further includes a pair of filters 72, 74. One filter 72 disposed adjacent the cap 34 and the other filter 74 disposed adjacent the closed lower end 38 of the cup member 32. Each of the filters 72, 74 are preferably formed of a polyester felt material, though other materials and fabric constructions may be employed. The filters 72, 74 serve to capture foreign matter entrained in the refrigerant as the refrigerant flows through the desiccant cartridge 12. Typically, each of the filters 72, 74 has a defined filter size. The size is chosen to prevent any desiccant 30 from exiting the desiccant cartridge 12 while correspondingly filtering debris or particulate matter from the refrigerant.

FIGS. 1 and 5 illustrate the cap 34 securing a desiccant 30 within the cup member 32. By way of example, the interior surface 58 of the cylindrical outer sidewall 40 of the cup member 32 is a smooth surface. Accordingly, after moving the cap 34 in position adjacent the open upper end 36 of the cup member 32, the cap 34 is pushed downward into the open upper end 36 of the cup member 32. Pushing the cap 34 into the open upper end 36 causes the fingers 52 of the cap 34 to deflect upwardly a slight distance whereby the sharp edge or corners 56 located on the free ends of the fingers 52 grippingly engage the interior surface 58 of the outer sidewall 40 of the cup member 32.

Pushing or driving the cap 34 downwardly into the open upper end 36 of the cup member 32 until it engages and sufficiently compresses the filter 72 and desiccant 30 secures the desiccant 30 and prevents or reduces movement of the desiccant 30. Reducing movement of the desiccant 30 correspondingly reduces abrasion and subsequent degradation of the desiccant 30 resulting from such movement. The fingers 52 resist and prevent any upward movement of the cap 34 towards the open upper end 36 of the cup member 32. Specifically, any upward force results in a camming or toggle-like action of the fingers 52 that increases the force on the fingers 52 driving the sharp edges or corners 56 of the fingers 52 further into engagement with the interior surface 58 of the outer sidewall 40. Accordingly, the cap 34 operates as a one-way lock mechanism that locks the cap 34 at any location along the interior surface 58 of the outer sidewall 40.

Accordingly, the fingers 52 are designed with an interference fit so as to flex upwardly and slide along the interior surface 58 of the outer sidewall 40 of the cup member 32 when the cap 34 is inserted into the open upper end 36 of the cup member 32 and pushed downward toward the desiccant 30. As such, insertion of the cap 34 within the cup member 32 involves a simple push-type operation wherein the cap 34 positively confines the filter 72 and desiccant 30 within the cup member 32 regardless of the amount of desiccant 30 located within the annular chamber 44 of the cup member 32.

The receiver/dryer assembly 10 described above enables a refrigerant to flow into the receiver/dryer assembly 10 through the inlet port 20 at the integrally closed upper end 16 of the canister 14, where it initially encounters the cap 34 of the desiccant cartridge 12. The refrigerant passes through the cap 34 via the radial slots 68 formed therein, through the filter 72, through the desiccant 30 enclosed within the annular chamber 44 of the cup member 32, through the filter 74 and exits the closed lower end 38 of the cup member 32 through the holes 70 therein. After flowing through the desiccant cartridge 12, the refrigerant flows through the exit tube 24 and exits the receiver/dryer assembly 10 through the outlet port 22 at the integrally closed upper end 16 of the canister 14.

During a preferred manufacturing sequence of the receiver/dryer assembly 10, the canister 14 is first formed by an impact forming process in which the integrally closed upper end 16, exit tube 24 and wall 64 of the canister 14 are simultaneously formed. The desiccant cartridge 12 is assembled separately by placing the closed lower filter 74 within the cup member 32 adjacent its lower end 38, and then filling the cup member 32 with an appropriate amount of desiccant 30. Conventionally, the desiccant 30 will be dispensed into the annular chamber 44 of the cup member 32 based on a predetermined weight. Because the volume of the desiccant 30 can vary depending on particle size, the fill level of the desiccant 30 within the cup member 32 is prone to deviate from a predicted level.

Next, the upper filter 72 is positioned on top of the desiccant 30, and the cap 34 is then inserted into the open upper end 36 of the cup member 32 until resistance is met as the cap 34 and filter 72 contact the desiccant 30. Thereafter, the fingers 52 engage the interior surface 58 of the outer sidewall 40 of the cup member 32 to prevent the cap 34 from moving upward. Securing the cap 34 to the cup member 32 in this manner completes the desiccant cartridge 12. Notably, the fingers 52 enable the cap 34 to be positioned relative to the fill level of the desiccant 30 in the cup member 32 in a manner that minimizes the internal volume of the desiccant cartridge 12 for the predetermined amount of desiccant 30 present. Accordingly, the cap 34 physically restrains the desiccant 30 within the annular chamber 44 of the cup member 32 and prevents the desiccant 30 from abrading itself.

To install the desiccant cartridge 12, the desiccant cartridge 12 is placed in the canister 14 such that the exit tube 24 extends into and through the passage 60 formed by the tubular portion 42 of the cup member 32. The desiccant cartridge 12 slides onto the exit tube 24 as far toward the integrally closed upper end 16 as possible. Once the desiccant cartridge 12 is in position, a roll groove 62 is formed in the wall 64 of the canister 14 to secure the desiccant cartridge 12 within the canister 14. It should be noted that it other mechanisms may also be used to secure desiccant cartridge 12 within the canister 14, including the use of a mechanical fastener engaging the exit tube 24 and contacting the closed lower end 38 of the desiccant cartridge 12.

Finally, the integral lower end 18 of the canister 14 is preferably closed using a friction spin-closure technique of a type known in the art. For this purpose, the initial length of the canister 14 must be longer than the desired finished length of the receiver/dryer assembly 10, to allow for the formation of the integral lower end 18. The canister 14 is typically chucked on a spindle and then rotated about its longitudinal axis at a suitable speed. An appropriate tool such as a spinning wheel is operated to engage the initially open lower end of the spinning canister 14 to displace the canister material radially inwardly to form the integral lower end 18 shown in FIG. 1.

In accordance with a second embodiment of this invention, as shown in FIG. 5, the apertures instead of being radial slots 68 as previously disclosed, may instead be circular apertures 78 extending transversely through the planar body 50 of the cap 34. Again, the size of the circular apertures 78 is determined by the desiccant 30 size and refrigerant flow properties.

FIGS. 6-7 illustrates a third embodiment according to the present invention wherein a plurality of fingers 80, having edges or corners 82 located thereon, are positioned along a peripheral edge of the central aperture 84. The fingers 80 function, as disclosed previously, to secure the cap 34 in place within the cup member 32. The primary difference is that instead of engaging the interior surface 58 of the outer sidewall 40 of the cup member 32, the fingers 80 engage an interior surface 86 (see FIG. 1) of the tubular portion 42 of the cup member 32.

FIG. 8 illustrates a fourth embodiment of the present invention wherein in the recesses 90 between the fingers 92 located on the outer periphery of the cap 34 are formed by upwardly deflecting tabs 94 that extend perpendicular to the planar body 50 of the cap 34. The tabs 94 cooperate and function together as a cylindrical flange member that helps guide the cap 34 into and within the open upper end 36 of the cup member 32. In addition, the upwardly extending tabs 94 assist in maintaining the orientation of the cap 34. For example, since the tabs 94 are transverse the planar body 50, the tabs 94 help orient the cap 34 roughly transverse the longitudinal axis of the tubular portion 42 to maintain a uniform thickness or distribution of the desiccant 30 within the annular chamber 44 of the cup member 32.

The present invention may also be used with an accumulator or dehydrator used in an automotive air-conditioning system. Typically, the accumulator is placed downstream of an evaporator and receives a partially vaporized refrigerant fluid that enters the accumulator at a relatively low pressure. The accumulator operates to ensure that only vapor refrigerant, not liquid refrigerant, flows to the compressor. In order that the vapor refrigerant be moisture free the accumulator typically includes a desiccant for dehydrating the vapor refrigerant prior to passage to the compressor. Accordingly, the present invention of a desiccant cartridge may be used within the accumulator to remove moisture and contaminants from the vaporized refrigerant prior before it flows to the compressor.

While the present invention has been described in terms of a preferred embodiment, it is apparent that other forms could be adopted by one skilled in the art. In other words, the teachings of the present invention encompass any reasonable substitutions or equivalents of claim limitations. Accordingly, the scope of the present invention is limited only by the following claims.

What is claimed is:

1. A desiccant cartridge for removing moisture from a refrigerant, said desiccant cartridge comprising:
    a cup member having:
        an open end;
        a closed end opposite said open end, said closed end defining a base;
        an outer sidewall having an interior surface free of protrusions; and
        a tubular portion extending upward from said base, said tubular portion defining a passageway through said cup member;
        whereby said tubular portion cooperates with said interior surface of said sidewall to form an annular chamber within said cup member;
    a desiccant disposed within said cup member; and
    a cap member having a planar body member, said planar body member having:
        an upper surface;
        a lower surface;
        an outer marginal periphery;
        a central aperture extending axially between said upper surface and said lower surface; and
        a plurality of fingers located on said outer marginal periphery of said cap member, said plurality of fingers extending at an angle with respect to said planar body of said cap member so as to create a one-way lock whereby said cap member is locked to said interior surface of said outer sidewall upon assembly of said cap member to said cup member.

2. A desiccant cartridge as claimed in claim 1 wherein said cap member has a plurality of apertures therein, said plurality of apertures providing a fluid path for refrigerant flow through said cap member.

3. A desiccant cartridge as claimed in claim 2 wherein said plurality of apertures include a plurality of slots extending radially outward from said central aperture.

4. A desiccant cartridge as claimed in claim 2 wherein said plurality of apertures include a plurality of circular apertures disposed about said central aperture.

5. A desiccant cartridge as claimed in claim 1 wherein said central aperture of said cap member further defines an inner marginal periphery;
    said cap member further comprising a second plurality of fingers on said inner marginal periphery; and
    said second plurality of fingers located on said inner marginal periphery of said cap member, said second plurality of fingers extending at an angle with respect to said planar body of said cap member so as to create a one-way lock with said tubular portion upon assembly of said cap member to said cup member.

6. A desiccant cartridge as claimed in claim 5 wherein said cap member has a plurality of apertures therein, said plurality of apertures providing a fluid path for refrigerant flow through said cap member.

7. A desiccant cartridge as claimed in claim 6 wherein said plurality of apertures include a plurality of slots extending radially outward from said central aperture.

8. A desiccant cartridge as claimed in claim 6 wherein said plurality of apertures include a plurality of circular apertures disposed about said central aperture.

9. A desiccant cartridge as claimed in claim 1 wherein the angle at which said fingers extend with respect to said planar body member of said cap member is in the range of 20° to 60°.

10. A desiccant cartridge as claimed in claim 1 wherein each of said fingers includes an edge, said edges engaging said interior surface of said outer sidewall of said cup member to secure said cap member to said cup member.

11. A desiccant cartridge as claimed in claim 1 including said cap member having a plurality of recesses, said recesses disposed between each of said plurality of fingers.

12. A desiccant cartridge as claimed in claim 1 including a plurality of tabs located between each of said plurality of fingers, said tabs positioned perpendicular to said planar body member and each of said plurality of fingers positioned at an angle with respect to said planar body member.

13. A desiccant cartridge for removing moisture from a refrigerant in an air-conditioning system, said desiccant cartridge comprising:
    a cup member having:
        an open end;
        a closed end opposite said open end, said closed end defining a base;
        an outer sidewall having an interior surface free of protrusions; and
            a tubular portion extending upward from said base, said tubular portion defining a passageway through said cup member;
            whereby said tubular portion cooperates with said interior surface of said sidewall to form an annular chamber within said cup member;
    a desiccant disposed within said cup member; and a cap member having a planar body member, said planar body member having:
  an upper surface; and
  a lower surface; and
  a one-way locking engagement member located on an outer periphery of said cap member, said one-way locking engagement member extending at an angle with respect to said planar body member; said one-way locking engagement member having an edge, said edge engaging said interior surface of said cup member to create a one-way lock to secure said cap member to said cup member.

14. A desiccant cartridge as claimed in claim 13 wherein said engagement member further comprises a plurality of fingers located on an outer marginal periphery of said body member whereby each of said plurality of fingers engage said interior surface of said outer sidewall of said cup member to create said one-way lock to secure said cap member to said cup member; and
  a plurality of apertures located in said cap member, said plurality of apertures providing a fluid path for refrigerant flow through said cap member.

15. A desiccant cartridge as claimed in claim 13 further comprising a central aperture extending between said upper and lower surfaces of said cap member, said central aperture defining an inner marginal periphery of said planar body member; and wherein said engagement member further comprises a plurality of fingers located on said inner marginal periphery of said planar body member whereby said plurality of fingers engage said tubular portion to create a one-way lock in order to secure said cap member to said cup member.

16. A desiccant cartridge for removing moisture from a refrigerant, said desiccant cartridge comprising:
  a cup member having an open end;
  a closed end opposite said open end;
  an outer sidewall having an interior surface free of protrusions and a tubular portion extending upward from a base, said tubular portion defining a passageway through said cup member;
  whereby said tubular portion cooperates with said interior surface of said outer sidewall to form an annular chamber within said cup member;
  a desiccant disposed within said cup member; and
  a cap member having a planar body member, a central aperture, a plurality of fluid flow apertures therethrough and an engagement member located on an outer marginal periphery of said cap member, said engagement member extending at an angle with respect to said planar body member and having an edge, said edge engaging said cup member to create a one-way lock whereby said cap member is locked to said interior surface of said outer sidewall upon assembly of said cap member to said cup member.

\* \* \* \* \*

UNITED STATES PATENT AND TRADEMARK OFFICE
CERTIFICATE OF CORRECTION

PATENT NO.        : 7,465,314 B2                                         Page 1 of 1
APPLICATION NO.   : 11/330890
DATED             : December 16, 2008
INVENTOR(S)       : Daniel F. Kiblawi It is certified that error appears in the above-identified patent and that said Letters Patent is hereby corrected as shown below:

In Column 1, Line 20 kindly delete "receiver dryer" and insert --receiver/dryer--.

In Column 4, Line 7 kindly delete "thorough" and insert --through--.

In Column 4, Line 56 kindly delete "β" and insert --α--.

In Column 4, Line 57 kindly delete "a" and insert --α--.

Signed and Sealed this

Third Day of March, 2009

JOHN DOLL
*Acting Director of the United States Patent and Trademark Office*